United States Patent
Prommel et al.

(10) Patent No.: US 6,837,133 B2
(45) Date of Patent: Jan. 4, 2005

(54) PIVOTAL GUARD COVER FOR HAND-HELD KITCHEN PEELER

(75) Inventors: Mark Prommel, New York, NY (US); Alec Drummond, Brooklyn, NY (US); Noah Zamansky, Sydney (AU)

(73) Assignee: Helen of Troy Limited, Bridgetown (BB)

( * ) Notice: Subject to any disclaimer, the term of this patent is extended or adjusted under 35 U.S.C. 154(b) by 16 days.

(21) Appl. No.: 10/338,413

(22) Filed: Jan. 8, 2003

(65) Prior Publication Data

US 2004/0128841 A1 Jul. 8, 2004

(51) Int. Cl.⁷ .............................................. B26B 29/02
(52) U.S. Cl. ............................... 83/13; 30/266; 99/588
(58) Field of Search .................. 30/280, 286, 279.6, 30/304, 123.5, 123.6, 123.7, 323, 222, 388, 2, 295, 294, 355; 99/584, 541–545, 588, 537, 635, 589, 590; D7/695

(56) References Cited

U.S. PATENT DOCUMENTS

| | | | |
|---|---|---|---|
| 2,246,368 A | * 6/1941 | Kuhnl | 30/34.05 |
| 2,309,444 A | 1/1943 | De Vault | 30/280 |
| 2,376,887 A | * 5/1945 | Walters | 30/125 |
| 2,487,624 A | * 11/1949 | Wiggers | 30/279.6 |
| 2,614,324 A | 10/1952 | Greenidge | |
| 2,645,851 A | 7/1953 | Ferrin | 30/280 |
| 2,650,424 A | * 9/1953 | Kalmon | 30/286 |
| 3,657,811 A | 4/1972 | Nissen et al. | |
| 3,781,988 A | 1/1974 | Jones | |
| 4,813,131 A | 3/1989 | Gruner | |
| 4,980,977 A | 1/1991 | Matin et al. | |
| 5,522,135 A | * 6/1996 | Votolato | 30/2 |
| 5,852,874 A | 12/1998 | Walker | 30/2 |
| 5,865,110 A | 2/1999 | Yonezawa | |
| 6,178,640 B1 | 1/2001 | Votolato | 30/2 |
| 6,308,418 B1 | 10/2001 | Sweet | |
| 6,336,271 B1 | 1/2002 | Rider et al. | |
| D457,790 S | 5/2002 | Wang et al. | |
| 6,510,611 B2 | 1/2003 | Edwards et al. | 30/90.6 |
| 6,553,641 B1 | 4/2003 | Garland et al. | 29/428 |
| 6,619,194 B1 | 9/2003 | Kuan | 99/588 |
| 2003/0074013 A1 | 4/2003 | Schooler et al. | 606/167 |

FOREIGN PATENT DOCUMENTS

| | | |
|---|---|---|
| DE | 8601559 | 3/1986 |
| DE | 4400144 | 7/1994 |
| FR | 1014173 | 8/1952 |

OTHER PUBLICATIONS

Pampered Chef (http://www.pamperedchef.com/our_products/use_care/detail.jsp?productld=4082#1), Jun. 3, 2002, 5 pages.

Pampered Chef (http:cgi.ebay.com/ws/ebayISAPI.dll$ViewItem&item=12750244&category=20641), 3 pages.

* cited by examiner

*Primary Examiner*—Allan N. Shoap
*Assistant Examiner*—Ghassem Alie
(74) *Attorney, Agent, or Firm*—Seyfarth Shaw LLP

(57) ABSTRACT

A method and apparatus for providing protection in connection with the cutting edge of a blade of a generally Y-shaped conventional kitchen peeler or cutter comprising a guard pivotally attached to the extension arms extending from the handle of the peeler, whereby the guard is pivotal between a guarding position immediately adjacent the cutting edge of the peeler blade and a non-guarding position exposing the cutting edge of the peeler blade for use.

13 Claims, 3 Drawing Sheets

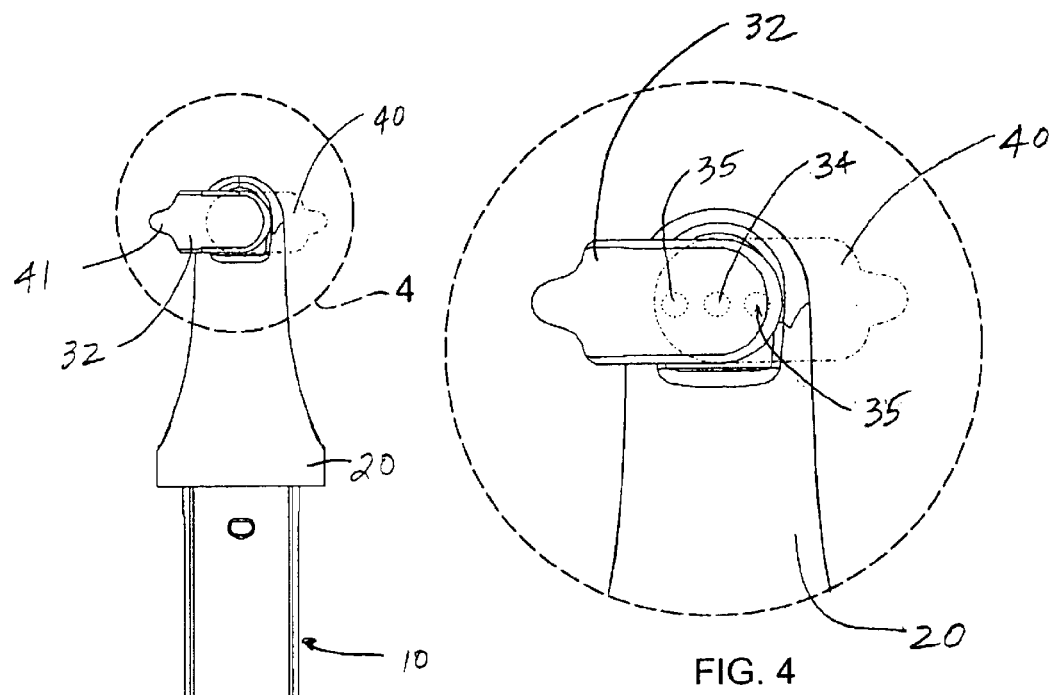
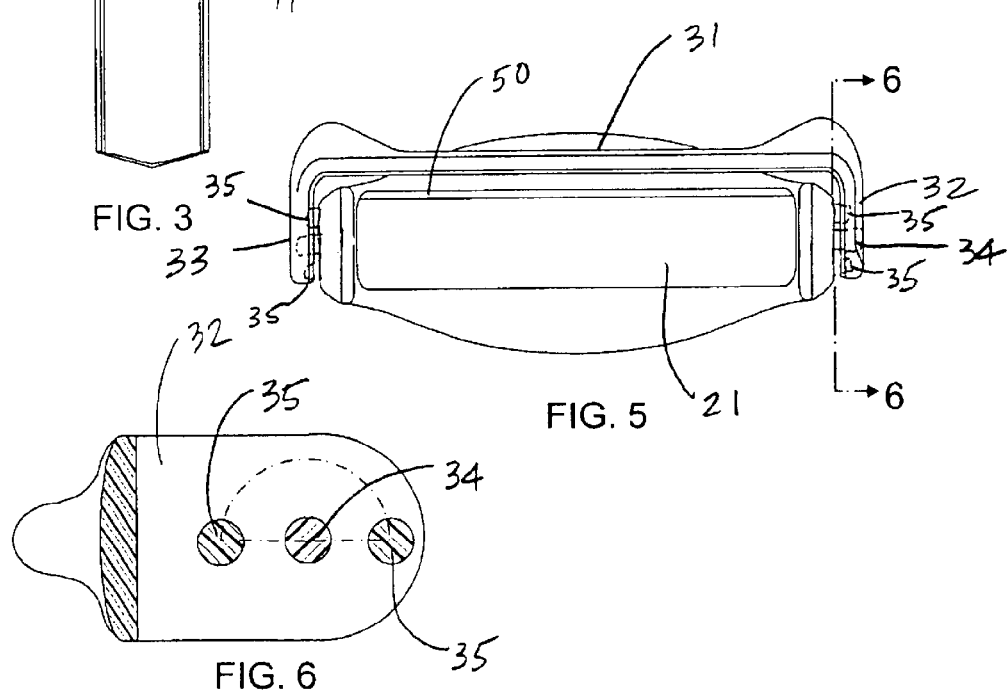

US 6,837,133 B2

PIVOTAL GUARD COVER FOR HAND-HELD KITCHEN PEELER

BACKGROUND OF THE INVENTION

The present application relates generally to hand-held kitchen tools and more particularly to a generally Y-shaped hand-held peeler with a pivotal protecting guard which safeguards the peeler blade(s) when not in use.

It is well-known that conventional kitchen peelers, such as julienne or vegetable/fruit peelers, must contain at least one cutting blade in order to perform their intended functions. These blades may contain sharpened, protruding teeth and/or a cutting edge to maximize their effectiveness. However, due to a lack of effective protection, the exposed blades are quickly dulled and damaged during non-use due to ordinary handling and storage. Furthermore, users are exposed to the risk of accidentally cutting themselves during the handling of such peelers because of the exposed blade.

It is known that a removable plastic cover can temporarily cover a peeler blade during non-use. In order to expose the blade, the cover is manually removed from the peeler and placed aside until use of the peeler is complete, whereupon the cover is aligned with the blade and manually replaced. However, a limitation of this cover exists in that it is often misplaced, is cumbersome to manually remove and replace, and generally exposes the user to accidental cutting of the user's fingers by necessitating the close proximity of the blade to the user's fingers during replacement.

SUMMARY OF THE INVENTION

The present application discloses an improved method and apparatus for guarding the cutting edge of the blade of a generally Y-shaped conventional kitchen peeler during non-use and/or storage. The present application provides a protective guard pivotally attached to the peeler head of a peeler and located adjacent to the blade. During non-use, the protective guard is urged into a first retained position adjacent to the cutting edge of the blade to afford appropriate protection. When use of the peeler is desired, the protective guard is pivoted to a second retained position wherein the cutting edge of the blade is exposed. Since the protective cover is pivotally attached to the peeler head, the possibility of misplacing the protective cover during use is eliminated and the ease of protecting the blade during non-use is maximized due to the permanent alignment of the protective cover relative to the blade and ease of pivotability.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages, should be readily understood and appreciated.

FIG. 3 is a side elevation view of the peeler of FIG. 2;

FIG. 4 is an enlarged, fragmentary side view of the portion of the peeler defined by circle 4 in FIG. 3;

FIG. 5 is a top, plan view of the peeler of FIG. 2;

FIG. 6 is an enlarged, cross-sectional view taken generally along line 6—6 in FIG. 5;

DETAILED DESCRIPTION

Figure 1:
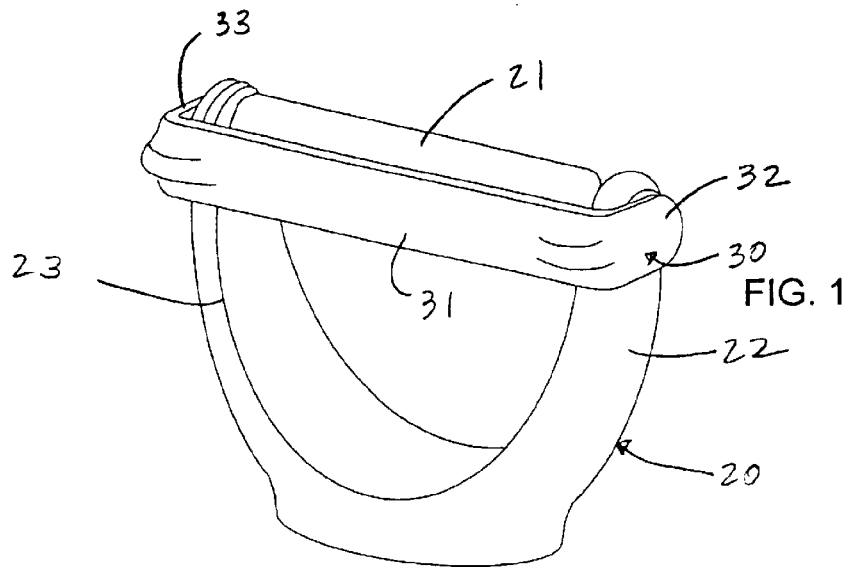
FIG. 1 is a perspective view of a head portion of a conventional generally Y-shaped peeler incorporating the protective guard cover of the present application.
Figure 2:
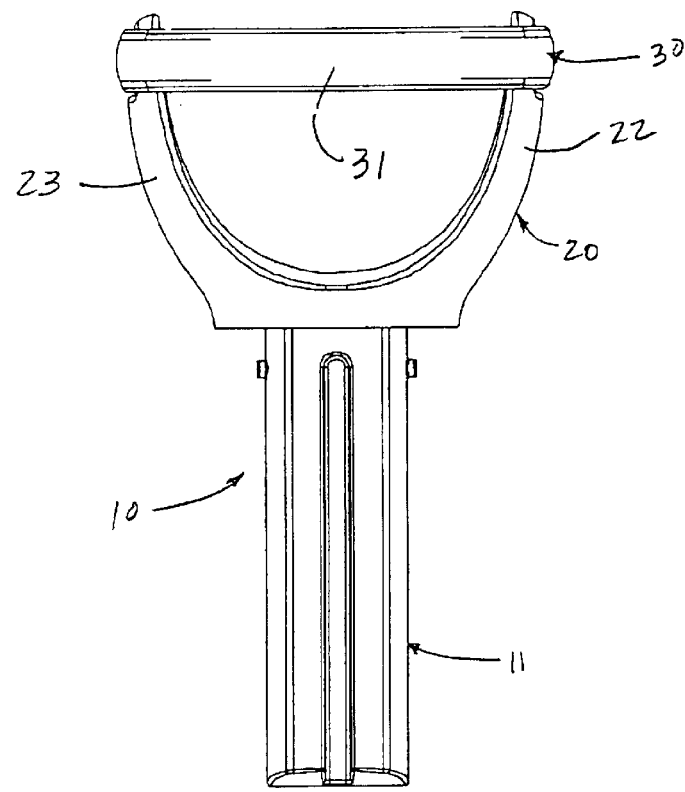
FIG. 2 is a reduced, front elevation view of a conventional generally Y-shaped peeler incorporating the head and cover of FIG. 1.

Disclosed herein is an improved method and apparatus for protecting the cutting edge of a blade of a conventional generally Y-shaped kitchen peeler or cutter with a pivotal protective guard cover. Referring to the figures, a conventional generally Y-shaped kitchen peeler 10 is illustrated having a handle portion 11 and a head portion 20 attached to one end thereof. The head portion 20 has first and second arms 22, 23 supporting a blade 21 having at least one cutting edge 50 or cutting teeth and disposed and oriented in a well-known manner to facilitate peeling and/or cutting by the cutting edge 50 of the blade 21. The blade 21 may be pivotally attached to the first and second arms 22, 23 to facilitate rotation and extensibility of use. Such a peeler 10 is well-known in the art.

There will now be described the improved method and apparatus of protecting the cutting edge 50 of the blade 21 with a pivotal protective guard 30. Each of the first and second arms 22, 23 comprise a first pivoting structure 24. The first pivoting structure 24 may comprise pivot pins adjacently located to the respective distal ends of the first and second arms 22, 23.

The protective guard 30 comprises a longitudinally oriented guard portion 31 of a length and width to appropriately cover the blade 21 when disposed adjacent thereto. The protective guard 30 may have first and second extensions 32, 33 extending therefrom respectively at the opposite ends of the guard portion 31 in a generally perpendicular manner. Each of the first and second extensions 32, 33 has a second pivoting structure 34 complimentary to and for pivotal engagement with the first pivoting structure 24 disposed on the first and second arms 22, 23. As illustrated in the figures, the second pivoting structure 34 may comprise apertures adjacently located to the respective distal ends of the first and second extensions 32, 33 respectively receiving the pivot pins disposed on the first and second arms 22, 23 for pivotal engagement therewith. It will be appreciated that, while the figures illustrate pivot pins disposed on the first and second arms 22, 23 and apertures disposed within the first and second extensions 32, 33 for pivotal engagement with the pivot pins, the pivot pins and apertures may be interchangeable wherein the pivot pins can be disposed on the first and second extensions 32, 33 and the aperture can be disposed within the first and second arms 22, 23. It will further be appreciated that the pivoting structures 24, 34 described herein can take the form of many different pivotal connections that will achieve a pivoting feature while not departing from the true scope and spirit of the embodiments described herein.

Figure 7:
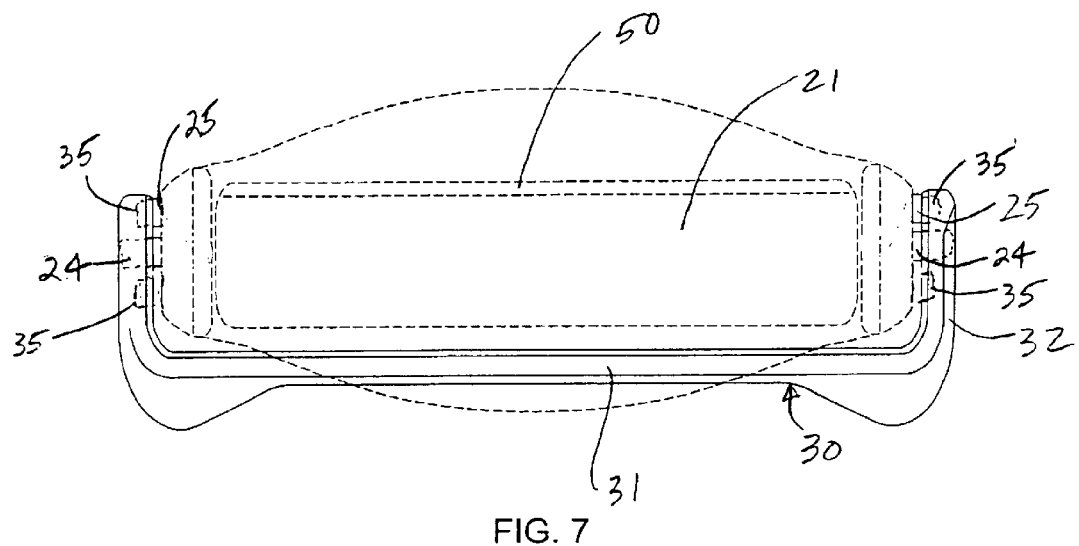
FIG. 7 is an enlarged, top, plan view of the peeler of FIG. 2 depicting the protective cover guard of the present application in an retracted position exposing the cutting edge of the blade.
Figure 8:
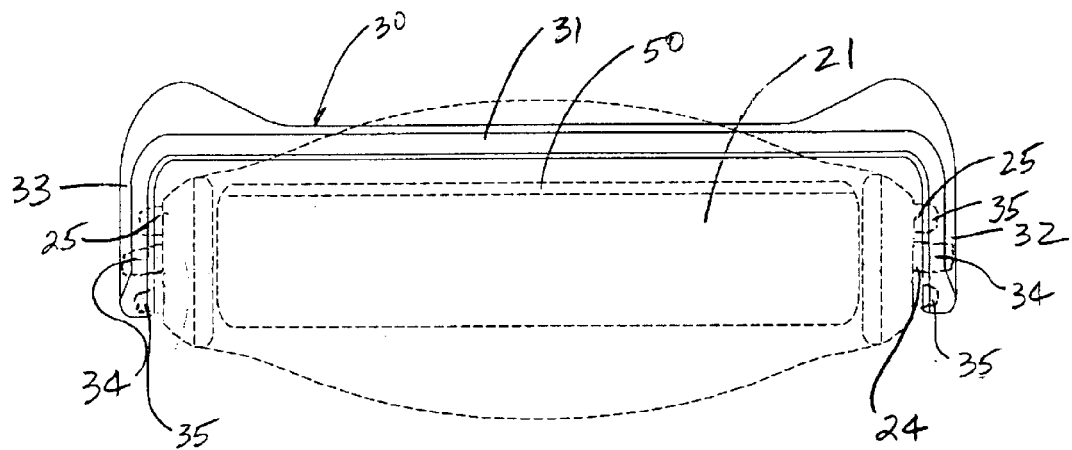
FIG. 8 is an enlarged, top, plan view of the peeler of FIG. 2 depicting the protective cover guard of the present application in a protective position protecting the cutting edge of the blade.

The first and second arms 22, 23, may also have an arm retaining mechanism 25 for retainable engagement with a complementary retaining mechanism 35 disposed on the first and second extensions 32, 33. A plurality of complementary retaining mechanisms 35 disposed on the extensions 32, 33, may be arranged approximately 180 degrees offset relative to each other and in a generally straight line relative to the pivoting structure 34 with the pivoting structure 34 being in the approximate middle and the retaining mechanisms 35 being the distal ends of the generally straight line. In another embodiment, at least two arm retaining mechanisms 25 are provided for retainable engagement with one complementary retaining mechanism 35 respectively disposed on the first and second extensions 32, 33. In yet another embodiment, one arm retaining mechanism 25 is provided on each arm 22, 23 for retainable engagement with two complementary retaining mechanisms 35 disposed on each extension 32, 33. Upon appropriate pivotal alignment, the retaining mechanisms 25, 35 position and hold the protective guard 30 in either a protective position 40 protecting the cutting edge 50 of the blade 21, as illustrated in FIG. 8, or a retracted position 41 thereby exposing the cutting edge 50 of the blade 21, as illustrated in FIG. 7.

The retaining mechanisms 25, 35 may be detent structures. In this regard, each arm retaining mechanism 25 may comprise an extension stub and each extension retaining mechanism 35 may-comprise a complementary recess for detentably receiving the extension stub. The retaining mechanisms 25, 35 are configured and designed to allow either deflection of the protective guard 30 or manual pivotal force exertion on the protective guard 30 to disengage the respectively retained positions. As such, when the protective guard 30 is placed in either a protective position 40 or a retracted position 41, the protective guard 30 will be held in that position until released.

Operation of the protective guard 30 occurs by manually pivoting the guard 30 about the pivoting structure 24, 34 in a well-known manner to a desired position until the retaining mechanisms 25, 35 are engaged. As such, it is anticipated that when a user desires to use the peeler 10, the protective guard 30 will be pivoted to a retracted position 41, thereby exposing the cutting edge 50 of the blade 21, and held in place with the retaining mechanisms 25, 35. It is also anticipated that when use of the peeler 10 is complete and protection of the cutting edge 50 of the blade 21 is desired, the user can simply disengage the retaining mechanisms 25, 35 with slight pivotal force, pivot the protective guard 30 into the protective position 40 thereby disposing the protective guard 30 adjacent to the cutting edge 50 of the blade 21, and re-engaging the retaining mechanisms 25, 35 to secure the protective guard 30. In such a position, the cutting edge 50 of the blade 21 will be protected from unwarranted dulling and damage and the user will be protected from accidental cutting.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

We claim:

1. A method of protecting a cutting edge of a blade extending between arms of a generally Y-shaped kitchen peeler, the method comprising:

providing a protective guard cover having a guard portion and extensions extending therefrom;

pivotally connecting the extensions to the arms so that the cover can rotate about the cutting edge of the blade; and retaining the protective guard cover in a desired pivotal position with an arm retaining mechanism disposed on each of the arms.

2. The method as claimed in claim 1 wherein each extension comprises an extension retaining mechanism for cooperative detent engagement with the arm retaining mechanism in either a protective position or a retracted position relative to the cutting edge of the blade.

3. A protective guard for a generally Y-shaped kitchen peeler having a handle portion and a head portion with two spaced apart arms with respective distal ends and at least one blade with a cutting edge disposed between the arms, the protective guard comprising:

an elongated cover having extensions respectively at opposite ends of the cover;

each arm having a first pivoting structure disposed thereon and a retaining mechanism disposed adjacent to the first pivoting structure for retaining the protective guard in a desired pivotal position; and each extension having a second pivoting structure disposed thereon and respectively coupled to the first pivoting structure to accommodate pivotal movement of the cover about the blade.

4. The protective guard as claimed in claim 3 wherein the first pivoting structure comprises pivot pins adjacently disposed on the respective distal ends of the arms.

5. The protective guard as claimed in claim 4 wherein the second pivoting structure comprises apertures respectively disposed on each extension for pivotal engagement with the pivot pins.

6. The protective guard as claimed in claim 1 wherein the retaining mechanism is a detent structure.

7. The protective guard as claimed in claim 1 wherein the cover is elongated in a direction that is substantially parallel to the cutting edge.

8. A generally Y-shaped kitchen peeler comprising:

a handle portion integral with a head portion;

two spaced-apart arms integral with the head portion and having respective distal ends and a blade with a cutting edge disposed therebetween;

an elongated cover having extensions respectively at opposite ends of the cover;

each arm having a first pivoting structure disposed thereon;

each extension having a second pivoting structure disposed thereon and respectively coupled to the first pivoting structure to accommodate pivotal movement of the cover about the cutting edge of the blade; and an arm retaining mechanism disposed adjacent to the first pivoting structure of each arm for retaining the elongated cover in a desired pivotal position.

9. The kitchen peeler as claimed in claim 8 wherein the first pivoting structure comprises pivot pins adjacently disposed on the respective distal ends of the arms.

10. The protective guard as claimed in claim 9 wherein the second pivoting structure comprises apertures respectively disposed on the extensions for pivotal engagement with the pivot pins.

11. The kitchen peeler as claimed in claim 8 wherein each extension further comprises an extension retaining mechanism for retaining engagement with the arm retaining mechanism thereby defining a retracted position and a protective position of the protective guard cover relative to the cutting edge of the blade.

12. The kitchen peeler as claimed in claim 11 wherein the first and second retaining mechanisms are a detent structure.

13. The protective guard as claimed in claim 8 wherein the cover is elongated in a direction that is substantially parallel to the cutting edge.

* * * * *